United States Patent

Ehrola et al.

[11] Patent Number: 5,897,476
[45] Date of Patent: Apr. 27, 1999

[54] VARIABLE-CROWN ROLL LOADED BY MEANS OF SHOES

[75] Inventors: Juha Ehrola, Vaajakoski; Kari Holopainen, Jyväskylä; Pekka Kivioja, Muurame, all of Finland

[73] Assignee: Valmet Corporation, Helsinki, Finland

[21] Appl. No.: 08/511,486

[22] Filed: Aug. 4, 1995

[30] Foreign Application Priority Data

Aug. 4, 1994 [FI] Finland ..................... 943620

[51] Int. Cl.$^6$ .......................................... B29C 43/46
[52] U.S. Cl. ...................... 492/7; 492/50; 162/358.3
[58] Field of Search ................... 492/7, 50, 20; 162/358.3

[56] References Cited

U.S. PATENT DOCUMENTS

| | | | |
|---|---|---|---|
| 1,997,442 | 4/1935 | Walsh | 492/50 |
| 2,614,058 | 10/1952 | Francis | 492/50 |
| 3,802,044 | 4/1974 | Spillmann et al. | 492/7 |
| 3,889,334 | 6/1975 | Justus et al. | 492/7 |
| 4,068,360 | 1/1978 | Freuler | 492/7 |
| 4,069,569 | 1/1978 | Meckel et al. | 492/50 |
| 4,156,958 | 6/1979 | Miesch | 492/50 |
| 4,249,290 | 2/1981 | Lehmann | 492/7 |
| 4,287,021 | 9/1981 | Justus et al. | 162/358.3 |
| 4,352,228 | 10/1982 | Iso-Aho | 492/7 |
| 4,518,460 | 5/1985 | Hauser et al. | 492/7 |
| 4,570,314 | 2/1986 | Holik et al. | 162/358.3 |
| 4,661,206 | 4/1987 | Heitmann et al. | 162/358.3 |
| 4,856,156 | 8/1989 | Link et al. | 492/7 |
| 4,880,501 | 11/1989 | Schiel | 492/50 |
| 5,534,117 | 7/1996 | Roerig | 162/358.3 |

FOREIGN PATENT DOCUMENTS

| | | |
|---|---|---|
| 0062973 | 10/1982 | European Pat. Off. . |
| 0363887 | 4/1990 | European Pat. Off. . |
| 0593084 | 4/1994 | European Pat. Off. . |
| 46728 | 2/1911 | Germany .................. 492/50 |
| 1184145 | 2/1956 | Germany . |
| 3527912 | 2/1987 | Germany . |
| 342462 | 2/1931 | United Kingdom ........ 492/50 |

*Primary Examiner*—David P. Bryant
*Attorney, Agent, or Firm*—Steinberg & Raskin, P.C.

[57] ABSTRACT

A variable-crown roll including a stationary roll axle, a tubular roll mantle rotatably mounted by its ends on the roll axle by end bearings and hydraulic loading shoes arranged between the roll mantle and the roll axle. The loading shoes act upon an inner face of the roll mantle in a direction toward a nip defined in part by the roll, are supported on the roll axle and are loaded by a hydraulic pressure medium. The nip pressure is profiled in the axial direction of the roll by regulating the pressure of the pressure medium passed into the loading shoes. The roll mantle is made of a fiber-reinforced composite material so that the stability of shape of the roll mantle in the direction of the circumference is good, i.e., it maintains its shape, and the rigidity in the axial direction is low, i.e., it is profitable.

1 Claim, 6 Drawing Sheets

VARIABLE-CROWN ROLL LOADED BY MEANS OF SHOES

FIELD OF THE INVENTION

The present invention relates to a variable-crown roll loaded by means of shoes, comprising a stationary roll axle, a tubular roll mantle revolvingly mounted about the roll axle by its ends on by means of end bearings and hydraulic loading shoes arranged between the roll mantle and the roll axle. The hydraulic loading shoes act upon an inner face of the roll mantle in a direction of a nip formed in part by the variable-crown roll. Further, the loading shoes are supported on the roll axle and are loaded by means of a hydraulic pressure medium. The pressure in the nip can be profiled in the axial direction of the roll by independently regulating the pressure of the pressure medium passed into each of the loading shoes.

BACKGROUND OF THE INVENTION

In a variable-crown roll loaded by means of shoes, and in particular from the mantle of such a roll, different properties are required in the direction of the circumference of the mantle and in the direction of the roll axle. Variable-crown rolls are used commonly as nip rolls, and in such a case the shape of the mantle must remain unchanged even at high nip loads. However, when the nip pressure is to be profiled in the direction of the roll axle, the rigidity of the roll mantle in the axial direction must be low to enable the profiling. Conventional variable-crown rolls are thick-mantle steel rolls, in which case the profiling of the nip pressures requires that very high forces be applied to the roll mantle. For this reason, in certain cases, it would be advantageous if the roll mantle could be made thinner. The technique of manufacture of a mantle of a variable-crown roll that is currently used, however, restricts any reduction of the thickness of the steel mantles.

A second problem existing in the prior art variable-crown rolls is the high weight of the thick roll mantle and the drawbacks resulting from this weight. It is a significant drawback arising from the weight of the roll mantle that the properties of oscillation of the roll mantle are poor.

OBJECTS AND SUMMARY OF THE INVENTION

It is an object of the present invention to provide a variable-crown roll loaded by means of shoes that is of a novel type, by means of which roll, the drawbacks involved in the prior art variable-crown rolls are avoided.

It is another object of the present invention to provide a variable-crown roll loaded by means of shoes by whose means in a number of applications, a remarkable improvement is achieved in comparison to the prior art variable-crown rolls.

In view of achieving these objects and others, the roll mantle of the variable-crown roll in accordance with the invention is made of a fiber-reinforced composite material so that the stability of shape of the roll mantle in the direction of the circumference is good, i.e., it maintains its shape, and the rigidity in the axial direction is low, i.e., it is profitable. This is achieved by suitable orientation of the reinforcement fibers in the fiber-reinforced composite material.

By means of the invention, compared with the prior art, a number of advantages are obtained, of which, for example, the following should be stated herein. First, the roll in accordance with the present invention adequately meets the requirement that the nip pressures can be profiled in the axial direction in the desired way, at the same time as the shape of the roll mantle in the direction of the circumference remains unchanged even with high loads. This property has been obtained by means of a suitable choice of the material because, when the roll mantle is made of a fiber-reinforced composite material, the desired properties are obtained for the roll mantle, for example, by means of alignment of the reinforcement fibers and by means of the choice of the reinforcement materials. Compared with the prior art, it is a highly remarkable further advantage of the invention that the properties of oscillation of the roll are significantly better than in the prior art because, in the present invention, the weight of the roll mantle is just a fraction of the weight of a conventional steel mantle. It is a further advantage of the roll mantle of a roll in accordance with the present invention that the inner face of the mantle does not have to be machined because the shape of the inner face of the roll mantle, i.e., its cylindrical and circular shape and the quality of the surface of the inner face, are automatically suitable when the mantle is detached from its mold. The favorableness of the present invention is manifested best as the back-up roll of an extended-nip press, because in this application, compared with a normal nip, a lower surface pressure is applied to the roll mantle over a wider area. Of course, a roll in accordance with the invention can also be used as an ordinary nip roll.

Further advantages and characteristic features of the invention will come out from the following detailed description of the invention.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
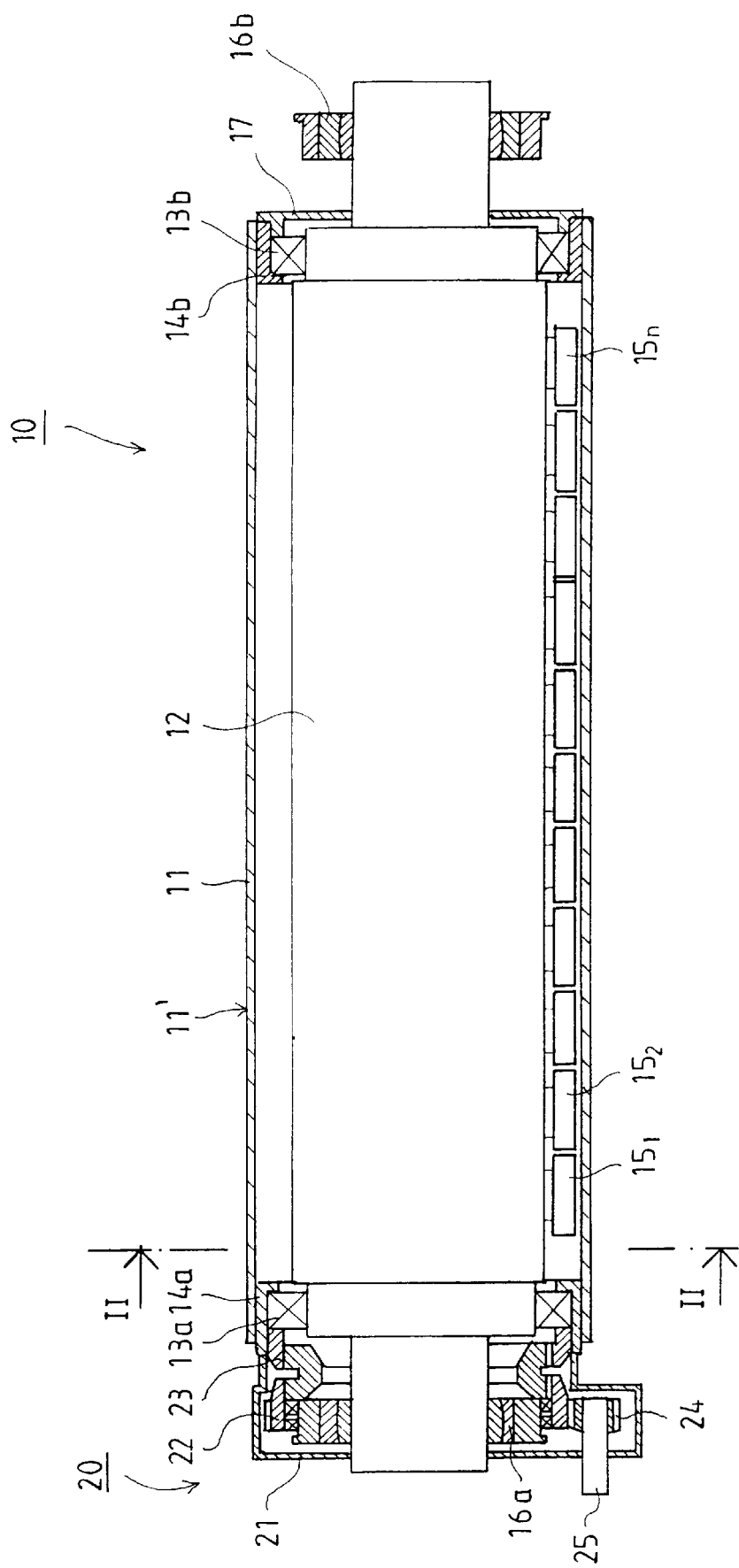
FIG. 1 is a vertical axial sectional view of a roll in accordance with the invention.

Referring to the accompanying drawings wherein the same reference numerals refer to the same or similar elements, in the illustrations in the drawing, the roll in accordance with the invention is denoted generally by reference numeral 10. As shown in FIG. 1, the roll 10 comprises a tubular roll mantle 11 which is mounted revolvingly or rotatably on a roll axle 12 by means of end bearings 13a,13b. Between the end bearings 13a,13b of the roll 10 and the roll mantle 11, support rings 14a, 14b are arranged to provide support for the roll mantle 11 on the end bearings 13a,13b. On the roll axle 12, loading shoes $15_1, \ldots, 15_n$ are arranged and are loaded by means of a hydraulic pressure medium in a position to be supported against the inner face of the roll mantle 11. The roll axle 12 is mounted by means of articulated beams 16a,16b on the frame of the paper machine or on an equivalent frame member.

Figure 2:
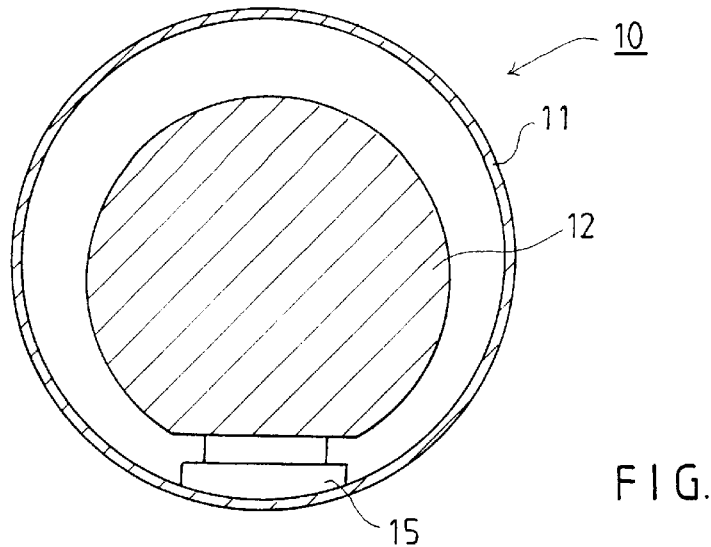
FIG. 2 is a sectional view of the roll in accordance with the invention taken along the line II—II in FIG. 1.
Figure 7A:
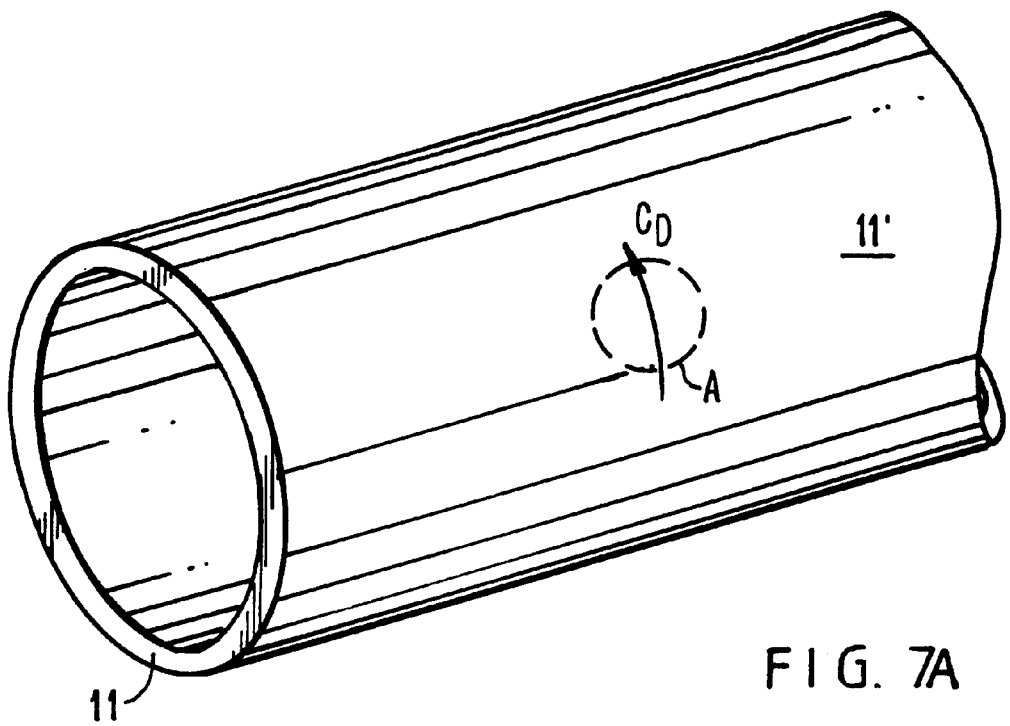
FIG. 7A is partial perspective view of the roll mantle of the roll used in accordance with the invention.

As illustrated in FIG. 1 and also in FIGS. 2 and 7A, the thickness of the roll mantle 11 is very small, compared with conventional variable-crown rolls with steel mantles.

Figure 7B:
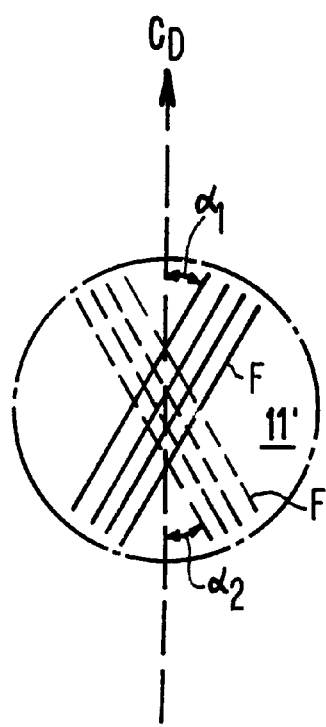
FIG. 7B is an enlarged view of section A as shown in FIG. 7A.

In accordance with the invention, the roll mantle 11 is made of a fiber-reinforced composite material, for example, by means of a normal manufacturing technique by winding onto a mandrel. In the material, preferably a continuous fiber F is employed, which is aligned in the desired way to provide the desired properties of the roll mantle 11, e.g., in a spiral (FIG. 7B). The continuous fiber F may be a single fiber which extends over the entire roll mantle 11 or several fibers which are wound essentially within the entire roll mantle. Alternatively, a plurality of fibers may be employed in varying angular orientations. By means of the methodical alignment of the reinforcement fiber(s) and choice of the reinforcement materials, the desired properties are provided in the different directions. As stated above, it is desired that the shape of the roll mantle is maintains and remains substantially unchanged in the direction of the circumference even at high loads, whereas the rigidity of the mantle in the axial direction should be low in order that the roll mantle and nip pressures can be profiled in the axial direction. By means of an orientation of the fiber(s) in the direction of the circumference of the roll mantle in the composite material of the roll mantle 11, the roll mantle 11 can be made rigid in one direction, i.e., the direction of the circumference due to the strength provided by the fiber(s), and correspondingly flexible in another direction, i.e., the rigidity in the direction of the roll axle 10 or the axial direction remains lower since the fiber(s) does not have much of a strengthening effect on the roll mantle in the axial direction in view of its orientation. However, in practice the fiber(s) cannot be aligned fully in the direction of the circumference, but, in view of successful manufacture of the roll mantle, the alignments of the reinforcement fibers must be made at an angle of about 5° to about 25° in relation to the direction of the circumference $C_D$. Thus, as shown in FIG. 7B, fiber(s) F in solid lines is arranged at an angle $\alpha_1$ which is in the range of about 5° to about 25° relative to the circumferential direction wherein fiber(s) F in dashed lines is arranged at an angle $\alpha_2$ which is in the range of about −5° to about −25° relative to the circumferential direction. The circumferential direction $C_D$ is defined as the directional vector about the circumference of the roll mantle 11 at each point along the axis extending through the center of the roll mantle 11, which is cylindrical.

As the composite material of the roll mantle 11, preferably carbon-fiber reinforced epoxy is used, even though other, alternative materials are also possible. As examples of such other alternative materials should be mentioned, for example, that, as the matrix of the composite material, it is possible to use, e.g., some metal, such as aluminum.

The outer face 11' of the roll mantle can be coated in a way similar to steel faces. Thus, the outer face 11' of the roll mantle can be provided, for example, with an elastomer or rubber coating when the roll is used as an ordinary nip roll, also when a felt runs between the roll mantle and the paper web. In particular, when a roll 10 in accordance with the invention is used as a back-up roll of an extended-nip press in a single-felt extended-nip press in which the paper web enters into direct contact with the roll, the outer face 11' of the roll mantle must be provided with a coating that adheres to the paper web, on the one hand, and is well separated from the paper web, on the other hand. In such a case, it is favorably possible to use a ceramic coating as the material of the coating.

The roll 10 as shown in FIG. 1 is provided with a drive gear 20. As such, the roll is particularly well suitable for use as a back-up roll in an extended-nip press. Since the material of the roll mantle 11 differs from conventional steel rolls in respect of its properties of strength and rigidity, the drive gear cannot be attached directly to the roll mantle 11 itself. Thus, a driven cogwheel 22 of the drive gear 20 is attached to the support ring 14a of the end bearing 13a of the roll by means of a support 23. In the other respects, the drive gear 20 involves conventional technology so that a driving cogwheel 24 mounted on a drive shaft 25 is in gear or toothed engagement with the driven cogwheel 22. The housing of the drive gear is denoted with the reference numeral 21 in FIG. 1. The opposite end of the roll 10 is provided with a roll end 17 attached to the support ring 14b of the end bearing 13b.

Figure 3:
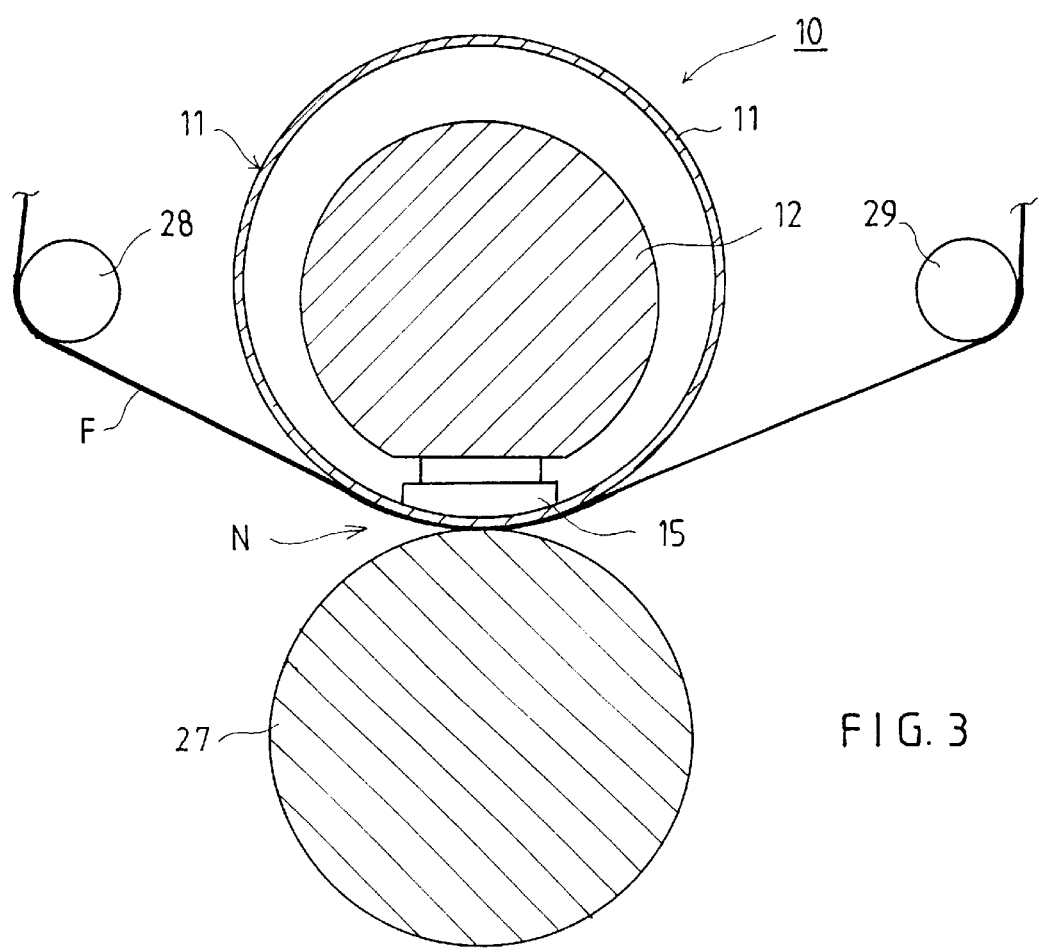
FIG. 3 is a sectional view of an application of the roll shown in FIG. 2 as a nip roll.

FIGS. 2 and 3 are vertical sectional views of the roll 10 in accordance with the invention, and in these figures, similarly to FIG. 1, the roll is denoted by reference numeral 10, the roll mantle is denoted by reference numeral 11, the roll axle is denoted by reference numeral 12 and the loading shoes are denoted by reference numeral 15. In the embodiment shown in FIG. 3, the roll 10 operates as a nip roll so that it forms a nip N with a back-up roll 27. A felt F is guided by alignment rolls 28,29 and runs through the nip N. As described above, in the embodiment of FIG. 3, the outer face 11' of the roll mantle is preferably provided with an elastomer or rubber coating.

Figure 4:
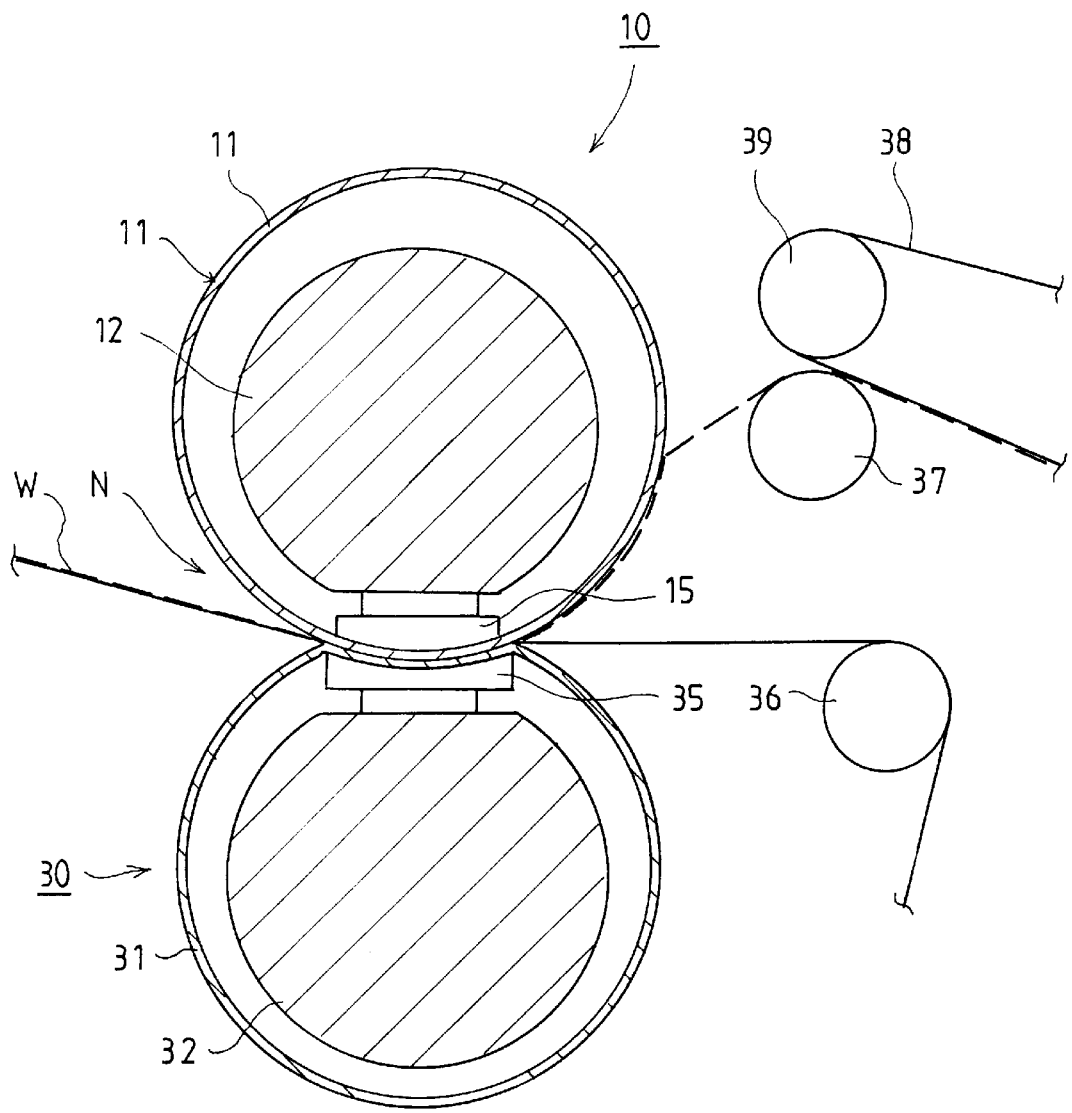
FIG. 4 is a sectional view of an application of a roll in accordance with the invention as a back-up roll in an extended-nip press.

FIG. 4 illustrates an embodiment in which a roll 10 in accordance with the invention is used as the back-up roll in an extended-nip press. For the roll 10, the same reference denotations are used as, for example, in FIGS. 2 and 3. In FIG. 4, the extended-nip press roll is denoted by reference numeral 30. In a normal manner, the extended-nip press roll 30 comprises a glidebelt mantle 31 passing around a stationary axle 32 and loading members 35 or equivalent loading shoes, which are arranged on the axle 32 and which are loaded by means of a hydraulic pressure medium against the inner face of the glide-belt mantle 31 toward the nip N. The loading members or the equivalent loading shoes 35 in the extended-nip press roll 30 are shaped so that their outer faces are concave outward in the manner shown in FIG. 4 so that, owing to this, an extended nip N is provided as the glide-belt mantle 31 follows along the concave outer faces of the loading shoes 35. The extended-nip press shown in FIG. 4 is a single-felt press in which the paper web W is passed into the nip N on support of the press felt F. After the nip N, the press felt F is passed, when guided by alignment rolls 36, as a loop around the extended-nip press roll 30. Since the extended-nip press shown in FIG. 4 is a single-felt press, in which the paper web W enters into direct contact with the roll mantle 11 of the roll 10 in accordance with the invention, the outer face 11' of the roll mantle is preferably provided with a coating which adheres to the paper web W, so that the paper web W can be made to run, after the nip N, over a certain distance along the outer face 11' of the roll mantle. Further, the coating must be such that the paper web W is separated readily from the outer face 11' of the roll mantle at the desired point, so that the paper web W can be separated from the outer face 11' of the roll mantle readily by means of a guide roll 37 to be passed onto the drying wire 38. In FIG. 4, the reversing roll of the drying wire 38 is denoted by reference numeral 39. Thus, in the outer face 11' of the roll mantle, it is preferable to use, for example, a ceramic coating.

Figure 5:
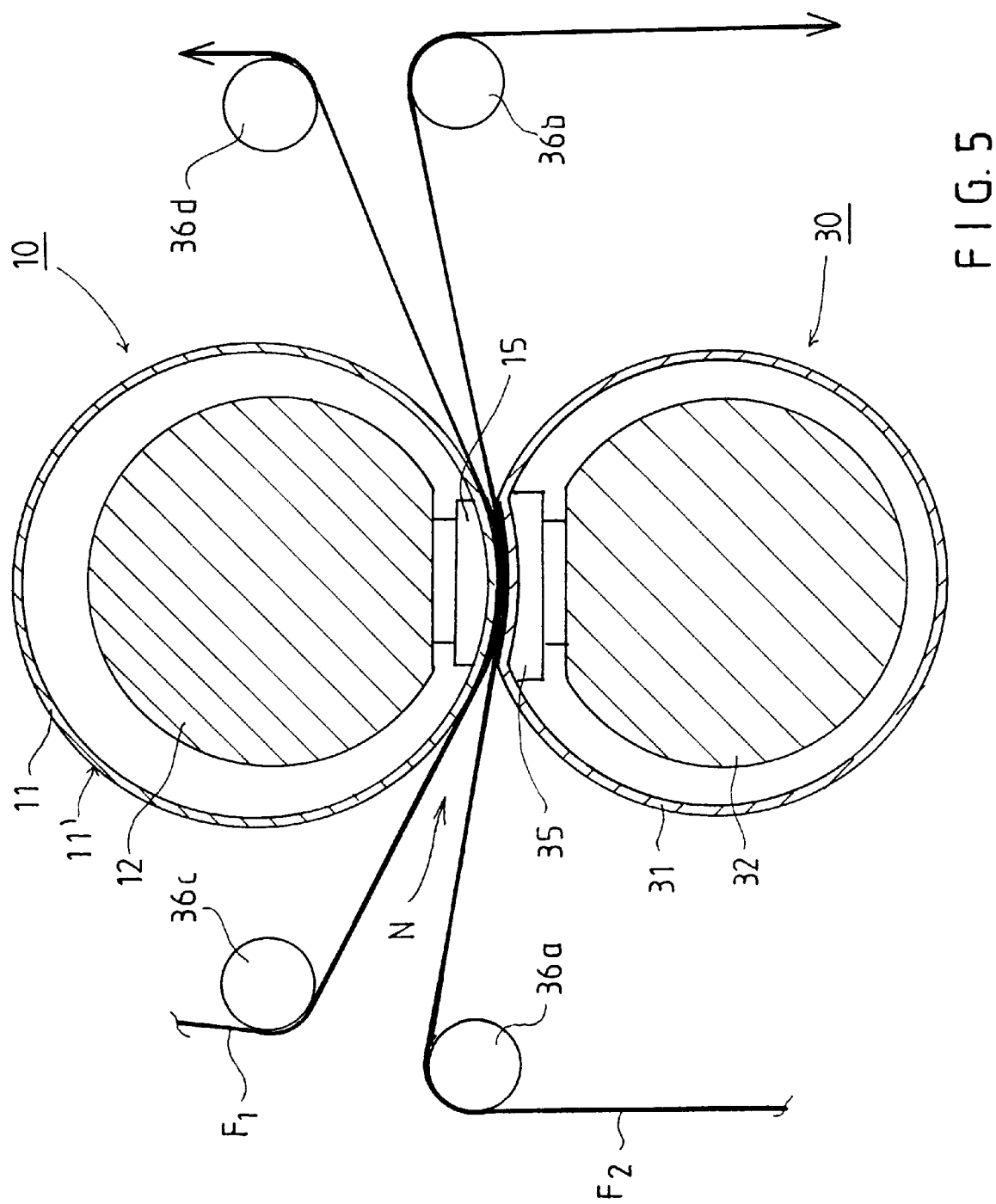
FIG. 5 is a sectional view of an application of a roll in accordance with the invention as a back-up roll in an extended-nip press, which press is provided with two press felts.

FIG. 5 shows an embodiment in which the roll 10 in accordance with the invention is used in a twin-felt extended-nip press as the back-up roll of the extended-nip press roll 30. For the roll 10 and for the extended-nip press roll 30, the same reference numerals are used as in the embodiment shown in FIG. 4. Thus, the extended-nip press shown in FIG. 5 is a twin-felt press, in which the press felts $F_1$ and $F_2$ are passed through the extended nip N while guided by alignment rolls 36$a$,36$b$,36$c$ and 36$d$. The paper web (not shown) that is passed into the nip N runs through the nip N between the press felts $F_1$ and $F_2$. Also in such a case, as described above, it is preferable that the outer face 11' of the roll mantle of the roll 10 in accordance with the invention is provided with an elastomer coating or an equivalent rubber coating.

Figure 6:
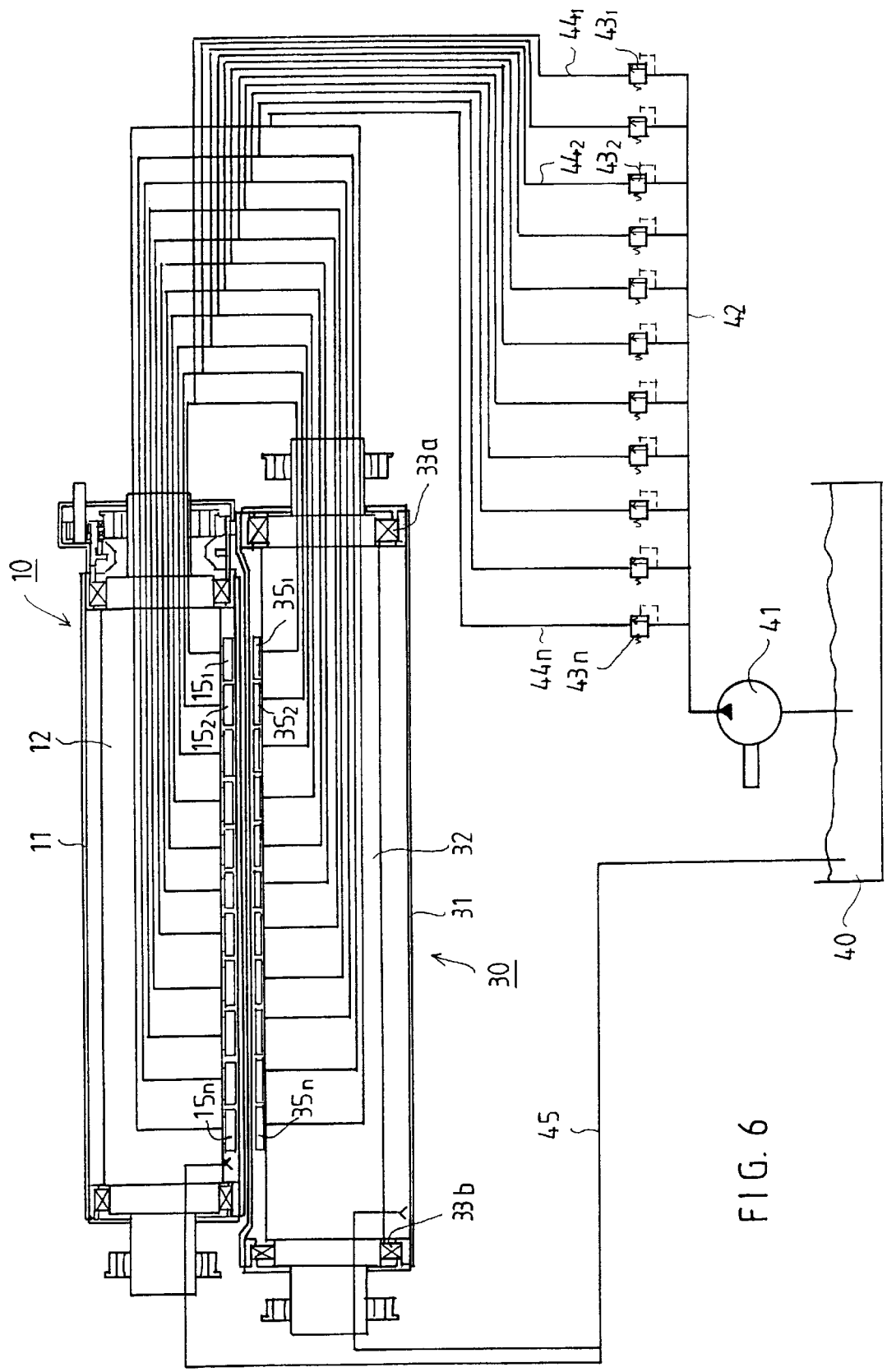
FIG. 6 shows a preferred embodiment of the hydraulic diagram when the roll in accordance with the invention is used as the backup roll of an extended-nip press.

Finally, FIG. 6 shows a preferred embodiment of the hydraulic diagram when the roll 10 in accordance with the invention is used as the back-up roll of an extended-nip press roll 30. In FIG. 6, the roll in accordance with the invention that operates as the back-up roll in the extended-nip press is denoted by reference numeral 10 and, as described above, the roll 10 comprises a stationary roll axle 12 onto which a roll mantle 11 is rotatably arranged. The roll mantle 11 is loaded toward the nip by means of loading shoes $15_1, \ldots, 15_n$, supported on the roll axle 12. Similarly, the extended-nip press roll is denoted by reference numeral 30. The extended-nip press roll 30 comprises a stationary roll axle 32 on which a glide-belt mantle 31 is arranged, which is mounted on the axle 32 by means of end bearings 33$a$,33$b$. The extended-nip press roll 30 is provided with loading members $35_1, \ldots, 35_n$ or equivalent loading shoes which are supported on the axle 32 and by whose means the glide-belt mantle 31 is loaded toward the nip. Both the loading shoes $15_1, \ldots, 15_n$ in the roll 10 of the present invention and the loading members $35_1, \ldots, 35_n$ in the extended-nip press roll 30 are loaded hydraulically.

For the purpose of loading the nip, the extended-nip press is provided with a hydraulic system which comprises a tank 40 for receiving and retaining hydraulic medium, from which a hydraulic pump 41 takes the hydraulic pressure medium and feeds the medium to the loading shoes $15_1, \ldots, 15_n$ of the roll 10 that operates as the back-up roll and to the loading members $35_1, \ldots, 35_n$ of the extended-nip press roll 30. In the system shown in FIG. 6, the pressure medium supplied by the hydraulic pump 41 is passed from a pressure pipe 42 to regulation valves $43_1, \ldots, 43_n$ and from these regulation valves along respective pressure ducts $44_1, \ldots, 44_n$ to the loading shoes of each roll. Further, from each roll, in a conventional manner, a return pipe 45 is passed back into the tank 40. The hydraulic system differs from the hydraulic systems of ordinary extended-nip presses so that the loading shoes $15_1, \ldots, 15_n, 35_1, \ldots, 35_n$ placed at both sides of the nip at corresponding locations are controlled by means of the same regulation valve $43_1, \ldots, 43_n$. Thus, the pressure ducts $44_1, \ldots, 44_n$ coming from the regulation valves $43_1, \ldots, 43_n$ are branched to the two rolls 10,30.

As a result of the structure described above, the system of regulation of the hydraulic system in the invention is simpler than in prior art constructions, and this has been achieved in particularly because the roll mantle 11 of the roll 10 in accordance with the invention has a low weight and can be profiled readily, as was already described above. In order that the regulation of the nip could be carried out successfully in the manner described above, it is additionally important that the areas of the loading shoes $15_1, \ldots, 15_n$ and $35_1, \ldots, 35_n$ placed at opposite sides of the nip are equally large, in which case, when the same pressure is passed to these loading shoes at both sides of the nip, the nip is loaded with equal forces from both sides of the nip.

It is understood that the above-described hydraulic system may be used in an extended-nip press in which the roll mantle of each of the variable-crown rolls in the extended-nip press are not made of a composite material. Rather, the roll mantle may have a conventional structure and thus the present invention provides the advantageous application of the same pressure via regulation means to loading shoes in each variable-crown roll to thereby load the nip with equal forces from both sides of the nip.

The examples provided above are not meant to be exclusive. Many other variations of the present invention would be obvious to those skilled in the art, and are contemplated to be within the scope of the appended claims.

We claim:

1. An extended-nip press, comprising
    a first press roll, and
    a second press roll in nip-defining relationship with said first press roll,
    each of said first and second press rolls comprising a variable-crown roll comprising a stationary roll axle, a tubular roll mantle having an axis and a circumference and being rotatably mounted by its ends on the roll axle by end bearings and hydraulic loading shoes arranged between the roll mantle and the roll axle, the loading shoes acting upon an inner face of the roll mantle in a direction of the nip and being supported on the roll axle, each of said loading shoes being independently loaded by a hydraulic pressure medium such that pressure in the nip is profitable in an axial direction of the roll by regulating the pressure medium directed into the loading shoes, the roll mantle comprising a composite material having at least one reinforcement fiber arranged such that the roll mantle maintains its shape in a circumferential direction of the roll mantle and is profitable in an axial direction of the roll mantle, said loading shoes in said first press roll having a concave shape and said loading shoes in said second press roll having a convex shape corresponding to the concave shape of said loading shoes in said first press roll,
    a plurality of hydraulic-pressure-medium regulation valves, each of said regulation valves having hydraulic-pressure-medium conduits coupled to one of said loading shoes in said first press roll and one of said loading shoes in said second roll axially aligned with said one of said loading shoes in said first roll, such that the same pressure provided by the hydraulic pressure medium is fed to opposite sides of the nip to be effective at the same axial location.

* * * * *